United States Patent
Eilts

[15] 3,699,391
[45] Oct. 17, 1972

[54] REACTOR FAULT RELAY

[72] Inventor: Larry E. Eilts, Golden, Colo.

[73] Assignee: The United States of America as represented by the Secretary of the Interior

[22] Filed: Sept. 2, 1971

[21] Appl. No.: 177,232

[52] U.S. Cl. ...................317/18 D, 317/27 R, 317/46
[51] Int. Cl. ..............................................H02h 3/16
[58] Field of Search............317/18 D, 18 R, 27 R, 46

[56] References Cited

UNITED STATES PATENTS

| | | |
|---|---|---|
| 2,360,151 | 10/1944 | Neher......................317/18 R |
| 2,381,281 | 8/1945 | Harder.....................317/18 R |
| 3,259,802 | 7/1966 | Steen......................317/18 R |

Primary Examiner—James D. Trammell
Attorney—Ernest S. Cohen et al.

[57] ABSTRACT

A relay for protecting three-phase, wye-connected circuits by monitoring neutral voltage. To prevent relay operation during normal unbalanced conditions, the current input to each phase is monitored, and relay operation enabled only when three currents are present.

5 Claims, 2 Drawing Figures

3,699,391

REACTOR FAULT RELAY

BACKGROUND OF THE INVENTION

In high voltage power transmission circuits, shunt reactors are used to compensate charging current. Typical installations in three phase systems employ three wye-connected reactors with a common neutral point and with each reactor connected to a different line conductor.

Because of the high voltage operating conditions in which shunt reactors are used, rapid circuit protection under fault conditions is critically important. Typical protection systems in present use employ fault relays responding to overvoltage, overcurrent, and impedance variations. A major defect of these relays is their insensitivity to nascent fault conditions and their relatively slow response times. As a result, reactor damage is often irreparable before prior art fault relays begin to operate. To overcome this defect of the prior art, my invention was made.

SUMMARY OF THE INVENTION

My invention is a relay circuit for protecting shunt reactors from damage caused by internal faults. Essentially, the relay is a sensitive, high-speed, current-enabled, overvoltage device. Faults are detected by monitoring the neutral voltage in a three-phase, wye-connected bank of reactors. A layer-to-layer fault in one reactor causes an impedance imbalance which results in a neutral voltage shift. In response, a neutral voltage detector in the relay circuit generates a signal which activates a circuit breaker system to disconnect the defective reactor bank.

Because some normal conditions of reactor operation involve a neutral voltage shift, an enabling system is used in my invention to differentiate normal from damaging operation. The enabling system monitors the current input to the three reactors in a three-phase bank. During some transient conditions, such as circuit closing and opening operations, unbalanced currents generate a neutral voltage sufficient to activate the relay. To avoid false tripping in such cases, my invention includes an enabling circuit which monitors the reactor current inputs and enables relay operation only when all three phase currents are present.

Therefore, one object of my invention is a relay for detecting damaging conditions in three phase, wye-connected circuits.

Another object of my invention is a relay which discriminates between normal and abnormal conditions to prevent inadvertent operation.

These and other objects of my invention are apparent in the following specification and drawings.

DESCRIPTION OF THE PREFERRED EMBODIMENT

Figure 1:
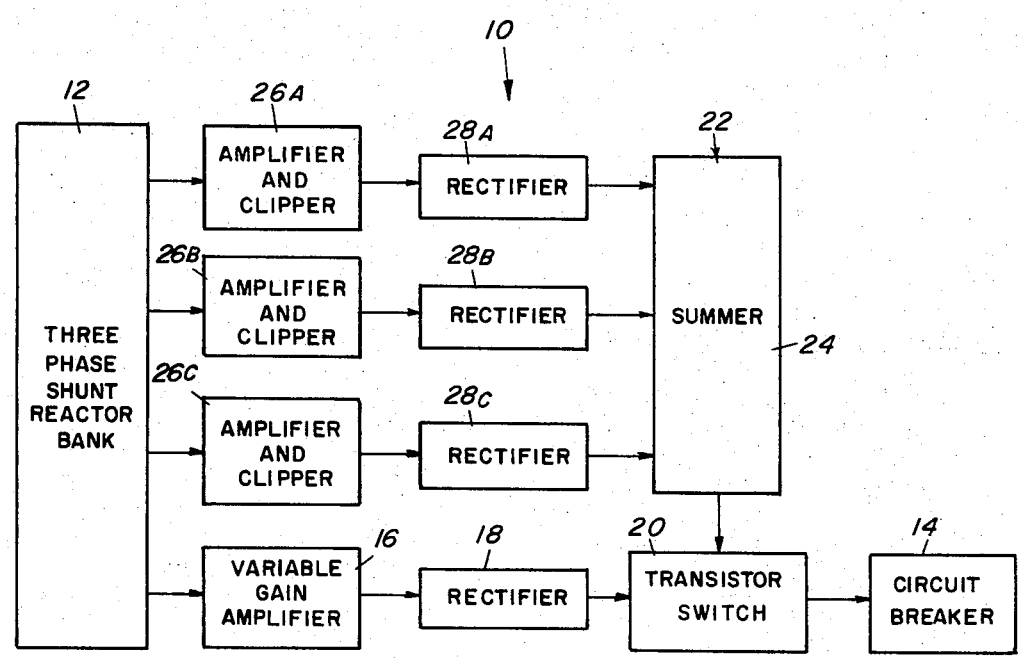
FIG. 1 is a block diagram of a fault relay.

A block diagram of a reactor fault relay is shown in FIG. 1. The relay 10 detects internal layer-to-layer faults in a three phase shunt reactor bank 12 and activates a circuit breaker system 14 to disconnect the reactor bank from a power line 30 before irreparable damage results. Faults are detected by monitoring the neutral voltage of the three phase reactor bank. When a fault occurs, unbalancing the reactor impedance, the resulting neutral voltage shift activates the circuit breaker system through an intermediate variable gain amplifier 16, a rectifier 18, and a transistor switch 20. Variable gain amplifier 16 enables adjustment of relay sensitivity. Transistor switch 20 is part of an enabling circuit 22 that guards against false relay tripping during normal unbalanced conditions caused by circuit opening and closing operations.

Enabling circuit 22 prevents false tripping by monitoring the three line currents of the reactor bank. When less than three currents are present, the circuit prevents activation of circuit breaker system 14. For each reactor phase current a signal is fed to a summer 24 through an intermediate amplifier and clipper 26A–26C, and a rectifier 28A–28C. During periods of normal operation, when all three currents are present, a combined signal from summer 24 enables transistor switch 20 for operation of the relay when a neutral voltage is detected.

Figure 2:
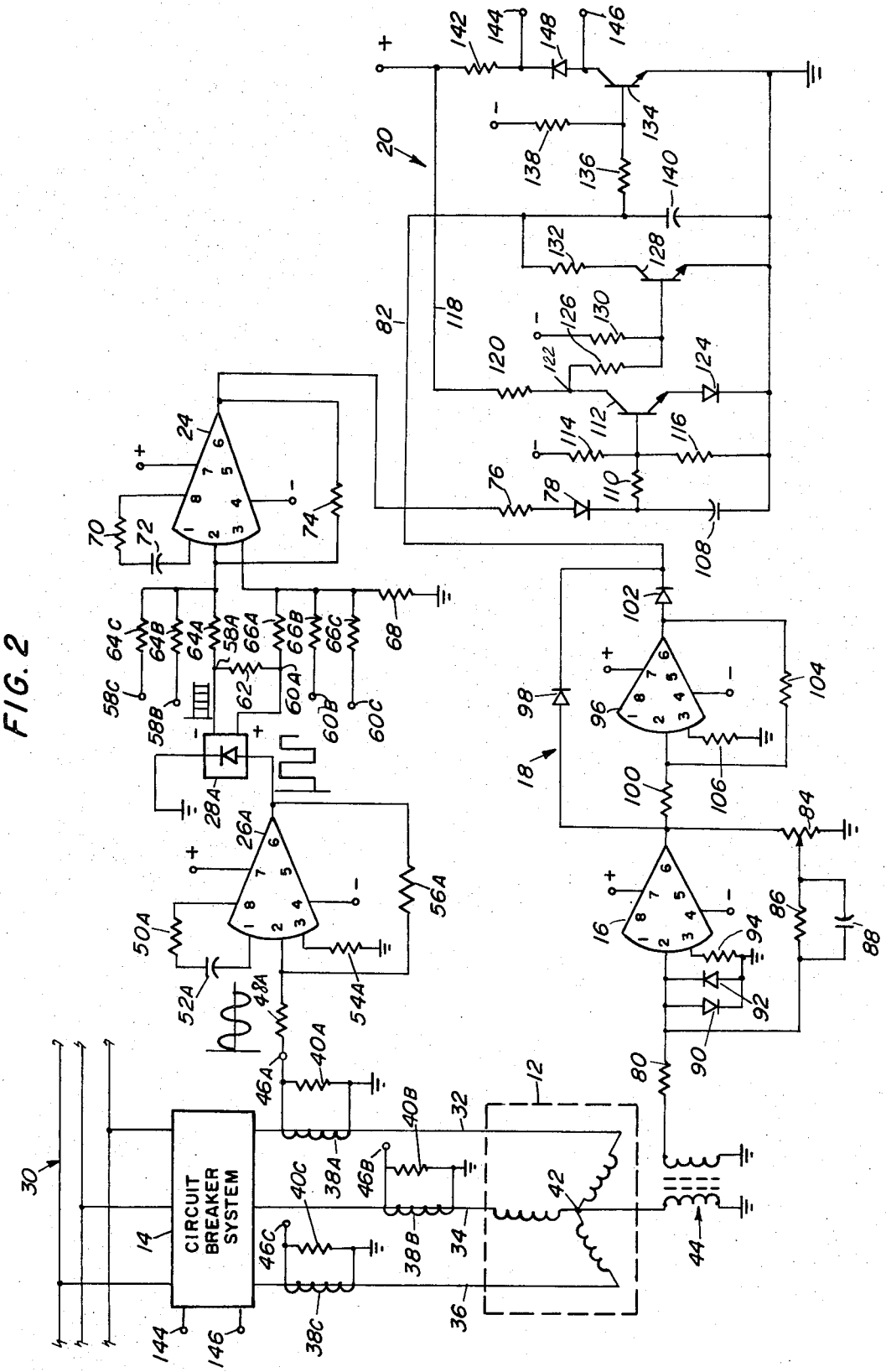
FIG. 2 is a partial schematic diagram of a fault relay.

A schematic diagram of reactor fault relay 10 is shown in FIG. 2 with the three phase shunt reactor bank 12 connected to a three phase power line 30 through intermediate circuit breaker system 14. For monitoring current flow through the reactor, the three reactor leads 32–36 pass through the induction coils of three current transformers 38A–38C. When current flows through the reactor leads, voltages are induced across grounded resistors 40A–40C, connected across the transformer secondary coils. These voltages are monitored by the reactor fault relay circuit to enable circuit interruption only when currents are simultaneously present in each of the three reactor phases.

To detect internal faults, the neutral point 42 of reactor bank 12 is grounded through the primary coil of a potential transformer 44. When a reactor fault occurs, a neutral voltage shift induces a voltage in the secondary coil of transformer 44, resulting in operation of circuit breaker system 14 if the three essential phase currents are present.

In the enabling circuit of fault relay 10, the sinusoidal voltages developed by reactor phase currents across resistors 40A–40C are fed through terminals 46A–46C and series resistors 48A–48C to the inverting inputs 2 of three similar operational amplifiers 26A–26C. For the sake of clarity in the drawing, only branch A of the enabling circuit is shown completely in FIG. 2; the omitted branches B and C are similar. Operational amplifier 26A is connected for inverting feedback operation. Between terminals 1 and 8 of the amplifier a series resistor and capacitor 50A–52A suppress high frequency oscillations. Noninverting input 3 is grounded through a resistor 54A. Negative and positive potential bias are applied to terminals 4 and 7 in a conventional manner. Between output terminal 6 and inverting input 2, a feedback resistor 56A controls the output voltage of amplifier 26A, which is clipped by saturation to a stable, fixed amplitude square wave output. From terminal 6 the square wave output of amplifier 26A passes to a full wave bridge rectifier 28A. Across the output terminals 58A–60A of the rectifier, a series resistor 62 provides a circuit path for the rectified d.c. output.

From terminals 58A–60A the d.c. voltage across resistor 62 is input through series resistors 64A–66A to the inverting and noninverting terminals 2 and 3 of an operational amplifier 24. The negative output of rectifier 28A is applied through a resistor 64A to the inverting input, and the positive output through resistor 66A to the noninverting input, with the amplifier connected for differential operation. Branches B and C of the enabling circuit are connected to terminals 2 and 3 in a similar manner through terminals 58B–60B and 58C–60C, and through series resistors 64B–66B and 64C–66C. Input terminal 3 is also grounded through a series resistor 68. Between terminals 1 and 8 of amplifier 24 a resistor 70 and a capacitor 72 serve the same purpose noted above for the corresponding elements associated with amplifier 26A. Negative and positive potential bias are applied to terminals 4 and 7 in a conventional manner. A feedback resistor 74, between terminals 2 and 6, and ground resistor 68 regulate the gain of amplifier 24.

The output at terminal 6 of amplifier 24 is a d.c. signal with a fixed amplitude directly proportional to the number of input signals received from branches A, B and C. When input signals from less than three branches are received, the lower voltage transmitted by amplifier 24 disables the breaker control circuit. When three input signals are received, indicating normal three phase reactor operation, the output of amplifier 24 enables the breaker control circuitry. From amplifier 24 this enabling signal is fed through a series resistor 76 and a blocking diode 78 to the transistor switching circuit 20 for controlling breaker operation.

A second signal input to transistor switching circuit 20 is derived from the secondary coil of potential transformer 44. In response to a neutral voltage shift in reactor 12, an a.c. signal is generated at the secondary coil and applied through a resistor 80 to the inverting input 2 of a variable gain, operational amplifier 16. This signal is converted to d.c. by a rectifier 18 and applied to the transistor switching circuit through a conductor 82.

Variable gain in amplifier 16 is achieved by a potentiometer 84 in a feedback loop between terminals 2 and 6. One end of the potentiometer coil is joined to terminal 6, the other is grounded. The potentiometer tap is joined to terminal 2 through a parallel resistor 86 and capacitor 88, which provide high frequency transient and noise attenuation. By varying the potentiometer setting, the gain of amplifier 16 is varied to adjust the detection sensitivity of the reactor fault relay over a wide range.

Parallel opposed diodes 90 and 92 from terminal 2 to ground protect amplifier 16 from damage by voltage overloads. The diodes limit the voltage at terminal 2 to the forward diode voltage above and below ground, typically about 0.5 volts. Normally the diodes are nonconducting and have no effect on amplifier operation. As with amplifiers 24 and 26, noninverting input 3 is grounded through a resistor 94, and negative and positive bias potentials are applied to terminals 4 and 7 in a conventional manner. Internal frequency compensation of amplifier 16 obviates the use of a compensating R-C circuit between terminals 1 and 8.

After amplification, the a.c. neutral voltage signal is converted to d.c. by a rectifier 18. A unity gain operational amplifier 96 in parallel with a diode 98 is used as a rectifier to reduce the effect of diode drop and to produce full wave rectification of the ground-referenced input signal with the output similarly referenced to ground, while avoiding the need for a transformer or isolation stage. Diode 98 routes a positive signal directly to the output conductor 82. A negative signal is applied through a resistor 100 to the inverting input of amplifier 96. The inverted output passes from output terminal 6, through a blocking diode 102, to conductor 82. A feedback resistor 104, between terminals 6 and 2, and a grounding resistor 106 have the same functions as previously described for amplifier 26A.

With inputs from enabling circuit 22 and the neutral voltage detection circuit, the transistor switch controls the operation of circuit breaker system 14. Through resistor 76 and diode 78 the enabling signal charges a capacitor 108 between the diode and ground. The charge on the capacitor is applied through a resistor 110 to the base of an NPN transistor 112. A negative bias is applied to the transistor base through voltage dividing resistors 114 and 116 in series between a negative source and ground. When three phase currents are present in the reactor circuit the output of amplifier 24 charges capacitor 108 with sufficient positive potential to drive transistor 112 into a conductive state. Diode 78, by blocking discharge of the capacitor through the amplifier circuit, increases the discharge time to hold transistor 112 conductive for longer than the charging time constant to prevent intermittent operation. With transistor 112 conducting, a current flows from a positive potential conductor 118 through a load resistor 120, terminal 122, transistor 112, and diode 124 to ground. Diode 124 insures that transistor 112 is nonconducting when its base potential is zero. Since the base must become slightly positive before the diode breaks down, additional bias is provided for the transistor.

Terminal 122, between load resistor 120 and the collector of transistor 112, is connected through a resistor 126 to the base of an NPN transistor 128. Negatively biased through a resistor 130, transistor 128 is in a conductive state in the absence of current flow through load resistor 120. When current flow through the load resistor lowers the potential of terminal 122, the decrease in potential switches transistor 128 to a nonconductive state. In summary, transistor 128 is normally conducting, unless three phase currents are present in reactor 12. When the three currents are present, transistor 128 switches off to enable operation of circuit breaker system 14 in the manner described below.

Current for activating circuit breaker system 14 is controlled by an NPN transistor 134. The transistor is in turn controlled by the neutral voltage detection signal, input from conductor 82 through a resistor 136 to the base of the transistor. Negative potential bias is applied to the base through a resistor 138, and operating potential through a capacitor 140, in parallel with load resistor 132 and transistor 128. When transistor 128 is in a conductive state, current flow through resistor 132 limits the charging of capacitor 140, holding transistor 134 in a normally open state. When transistor 128 is in a nonconductive state, resulting from the simultaneous presence of three reactor currents, capacitor 140 is charged sufficiently to overcome the negative bias and switch transistor 134 to a conductive state. From positive potential conductor 118 current flows through a load resistor 142, energizing the circuit breaker through a low voltage interface in circuit breaker system 14, which is connected to terminals 144 and 146 between the resistor and transistor. A diode 148 protects transistor 134 from transients generated by inductive elements in the breaker circuit when the circuit breaker system is ultimately de-energized.

Although a specific circuit is shown in FIG. 2 for implementing my invention, numerous modifications by persons skilled in the art are to be expected within the scope of this teaching. For this reason, the scope of the invention is limited only by the following claims.

I claim:

1. An electrical circuit for preventing damage to a three phase wye-connected circuit having three input leads and a common neutral point, comprising:
    means for detecting the voltage at the neutral point and generating a first control signal in response to a change in neutral voltage,
    means for detecting current flow in the three input leads and producing a second control signal only when current is flowing in each of the three leads,
    means for disconnecting the three phase circuit from a power supply in response to the simultaneous occurrence of the first and second control signals.

2. An electrical circuit is claimed in claim 1 in which:
    the means for detecting the voltage at the neutral point and generating a first control signal includes a transformer for isolating neutral voltage signals, a variable gain amplifier in series with the transformer for varying the intensity of the neutral voltage signals, and a rectifier in series with the amplifier for converting neutral voltage signals to the first control signal for input to the means for disconnecting.

3. An electrical circuit as claimed in claim 1 in which:
    the means for detecting current flow in the three input leads and producing a second control signal includes a transformer associated with each input lead for producing a representative voltage output in response to the presence of current flow in each lead, an amplifier for modifying the level of each representative voltage output, and a summer for producing the second control signal in response to the combined representative voltage outputs from all of the three leads.

4. An electrical circuit as claimed in claim 1 in which:
    the means for disconnecting the three phase circuit from a power supply includes a transistor switching circuit and a circuit breaker system, the switching circuit operating to suppress the effect of the first control signal upon the circuit breaker system unless the second control signal is simultaneously received.

5. An electrical circuit as claimed in claim 1 in which:
    the means for detecting the voltage at the neutral point and generating a first control signal includes a transformer for isolating neutral voltage signals, a variable gain amplifier in series with the transformer for varying the intensity of the neutral voltage signals, and a rectifier in series with the amplifier for converting neutral voltage signals to the first control signal for input to the means for disconnecting,
    the means for detecting current flow in the three input leads and producing a second control signal includes a transformer associated with each input lead for producing a representative voltage output in response to the presence of current flow in each lead, an amplifier for modifying the level of each representative voltage output and a summer for producing the second control signal in response to the combined representative voltage outputs from all of the three leads, and
    the means for disconnecting the three phase circuit from a power supply includes a transistor switching circuit and a circuit breaker system, the switching circuit operating to suppress the effect of the first control signal upon the circuit breaker system unless the second control signal is simultaneously received.

* * * * *